United States Patent
Maurus et al.

(10) Patent No.: US 12,119,725 B2
(45) Date of Patent: *Oct. 15, 2024

(54) ELECTRIC MACHINE

(71) Applicant: BorgWarner Inc., Auburn Hills, MI (US)

(72) Inventors: Christopher Joel Maurus, Hendersonville, NC (US); Jeffrey Carter, Harrogate (GB); Tyler Ransom Garrard, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/240,064

(22) Filed: Aug. 30, 2023

(65) Prior Publication Data

US 2023/0412031 A1 Dec. 21, 2023

Related U.S. Application Data

(63) Continuation of application No. 17/452,166, filed on Oct. 25, 2021, now Pat. No. 11,777,360.

(Continued)

(51) Int. Cl.
*H02K 3/52* (2006.01)
*F04D 17/10* (2006.01)
(Continued)

(52) U.S. Cl.
CPC .............. *H02K 3/522* (2013.01); *F04D 17/10* (2013.01); *F04D 25/06* (2013.01); *F04D 29/043* (2013.01);
(Continued)

(58) Field of Classification Search
CPC ............ H02K 3/12; H02K 3/48; H02K 3/487; H02K 3/522; H02K 1/20; H02K 7/1823;
(Continued)

(56) References Cited

U.S. PATENT DOCUMENTS 3,768,152 A 10/1973 Swanke et al.
4,161,669 A * 7/1979 Aimar ..................... H02K 3/522
                                                      310/260

(Continued)

FOREIGN PATENT DOCUMENTS

DE 102017211943 A1 1/2019
EP 236690 A2 9/1987

OTHER PUBLICATIONS

Machine-assisted English language abstract and machine-assisted English language translation for DE 10 2017 211 943 A1 extracted from espacenet.com database on Nov. 8, 2021, 31 pages.

(Continued)

*Primary Examiner* — J. Todd Newton
(74) *Attorney, Agent, or Firm* — Howard & Howard Attorneys PLLC

(57) ABSTRACT

An electric machine includes a rotor extending along an axis and a stator lamination stack radially spaced from the rotor. The stator lamination stack has circumferentially spaced teeth defining gaps therebetween. The electric machine also includes a coil winding disposed in the gaps between the circumferentially spaced teeth and a guard plate disposed at one of the first and second stator ends. The guard plate extends radially away from the axis and includes a plurality of teeth guards extending radially, with each of the teeth guards aligned with one of the teeth of the stator lamination stack to electrically insulate the coil winding from the teeth of the stator lamination stack. The plurality of teeth of the stator lamination stack extend radially inward toward the axis and the teeth guards of the guard plate extend radially inward toward the axis.

20 Claims, 8 Drawing Sheets

Related U.S. Application Data

(60) Provisional application No. 63/106,967, filed on Oct. 29, 2020.

(51) Int. Cl.
  *F04D 25/06* (2006.01)
  *F04D 29/043* (2006.01)
  *F04D 29/063* (2006.01)
  *H02K 1/20* (2006.01)
  *H02K 7/18* (2006.01)
  *H02K 15/00* (2006.01)

(52) U.S. Cl.
  CPC ............ *F04D 29/063* (2013.01); *H02K 1/20* (2013.01); *H02K 7/1823* (2013.01); *H02K 15/0031* (2013.01); *H02K 2203/12* (2013.01)

(58) Field of Classification Search
  CPC ............ H02K 15/0031; H02K 2203/12; F04D 17/10; F04D 25/06; F04D 29/043; F04D 29/063; F04D 17/12; F04D 25/024; F04D 25/0606; F05D 2220/40; F02B 39/10; F02B 37/10; F02C 6/12
  See application file for complete search history.

(56) References Cited

U.S. PATENT DOCUMENTS

| | | | |
|---|---|---|---|
| 6,930,427 B2 * | 8/2005 | Grant | H02K 1/16 310/215 |
| 7,102,267 B2 | 9/2006 | Gromoll et al. | |
| 8,384,257 B2 | 2/2013 | Kinugawa et al. | |
| 9,473,001 B2 | 10/2016 | Matsumoto | |
| 10,554,088 B2 | 2/2020 | Huang et al. | |
| 2008/0116761 A1 | 5/2008 | Lin et al. | |
| 2009/0324435 A1 | 12/2009 | Sears et al. | |
| 2010/0175377 A1 | 7/2010 | Hippen et al. | |
| 2010/0284824 A1 | 11/2010 | Hippen et al. | |
| 2011/0148245 A1 | 6/2011 | Wang et al. | |
| 2014/0056721 A1 | 2/2014 | Garrard et al. | |
| 2014/0056726 A1 | 2/2014 | Garrard et al. | |
| 2018/0013326 A1 | 1/2018 | Mongeau | |
| 2020/0204051 A1 | 6/2020 | An et al. | |
| 2022/0140688 A1 | 5/2022 | Maurus et al. | |

OTHER PUBLICATIONS

English language abstract and machine-assisted English translation for EP 0 236 690 A2 extracted from espacenet.com database on Nov. 8, 2021, 17 pages.

* cited by examiner

FIG. 2A

ELECTRIC MACHINE

CROSS-REFERENCE TO RELATED APPLICATIONS

The present application is a continuation of and claims priority to and all the benefits of U.S. patent application Ser. No. 17/452,166, filed Oct. 25, 2021, and claims priority to and all benefits of U.S. Provisional Patent Application No. 63/106,967, filed Oct. 29, 2020, the disclosures of which are both expressly incorporated herein by reference in their entirety.

BACKGROUND OF THE INVENTION

1. Field of the Invention

The present invention generally relates to an electric machine.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in the vehicle reduces the mass and aerodynamic frontal area of the vehicle, which helps reduce fuel consumption of the internal combustion engine and improve fuel economy of the vehicle.

Typical turbochargers include a shaft, a compressor wheel coupled to the shaft for compressing air to be delivered to the internal combustion engine, and a turbine wheel coupled to the shaft for receiving exhaust gas from the internal combustion engine. Many conventional turbochargers are electrically-assisted turbochargers that include an electric machine coupled to the shaft for providing rotational energy to the shaft.

Conventional electric machines in electrically-assisted turbochargers include a rotor rotatably coupled to the shaft, a stator lamination stack disposed about the rotor, and a coil winding coupled to the stator lamination stack. The coil winding typically contacts the stator lamination stack and bends sharply at the ends of the stator lamination stack. Sharp bends and irregularities typically cause the coil winding to degrade at particular sections of the coil winding undergoing the sharp bends and irregularities. Degradation of the coil winding is detrimental to the function of the electric machine because contact between a degraded section of the coil winding and an electrically conductive component of the electric machine (e.g., the stator lamination stack) is able to short the electric machine and prevent the electric machine from operating properly.

As such, there remains a need to provide an improved electric machine for an electrically-assisted turbocharger.

SUMMARY OF THE INVENTION AND ADVANTAGES

An electric machine includes a rotor extending along the axis and a stator lamination stack radially spaced from the rotor. The stator lamination stack has a first stator end and a second stator end spaced from the first stator end. The stator lamination stack also has a plurality of circumferentially spaced teeth extending between the first and second stator ends, with the plurality of circumferentially spaced teeth extending radially with respect to the axis and with the plurality of circumferentially spaced teeth defining gaps therebetween.

The electric machine further includes a coil winding disposed in the gaps between the circumferentially spaced teeth of the stator lamination stack. The coil winding may transmit electric current through the coil winding to rotate the rotor. The electric machine further includes a guard plate disposed at one of the first and second stator ends of the stator lamination stack. The guard plate extends radially away from the axis and includes a plurality of teeth guards extending radially with respect to said axis. Each of the plurality of teeth guards is aligned with one of the plurality of teeth of the stator lamination stack to electrically insulate the coil winding from the plurality of teeth of the stator lamination stack. The plurality of teeth of the stator lamination stack extend radially inward toward the axis and the teeth guards of the guard plate extend radially inward toward the axis.

The guard plate prevents the coil winding from contacting the teeth of the stator lamination stack at either the first stator end or the second stator end, thus providing electrical isolation between the coil winding and the teeth of the stator lamination stack. Instead, the coil winding contacts the teeth guards of the guard plate, thus allowing the coil winding to curve without any sharp bends or irregularities. As such, the teeth guards of the guard plate prevent the coil winding from undergoing stress and degrading at any particular section of the coil winding undergoing sharp bends or irregularities. Therefore, the teeth guards of the guard plate prevents degradation of the coil winding and also prevents contact between a degraded section of the coil winding and an electrically conductive component of the electric machine (e.g., the teeth of the stator lamination stack). Thus, the guard plate prevents the electric machine from shorting and ensures the proper operation of the electric machine.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2A is a cross-sectional view of the electric machine of FIG. 1 taken along the axis A, with the stator lamination stack having a first stator end, a second stator end spaced from the first stator end, and a plurality of circumferentially spaced teeth extending radially with respect to the axis and defining gaps therebetween, and with the electric machine including a coil winding disposed in the gaps between the circumferentially spaced teeth, a guard plate disposed at the first stator end of the stator lamination stack and presenting a curved surface facing away from the first and second stator ends and defining a concave recess, with the coil winding disposed at least partially in the concave recess;

DETAILED DESCRIPTION OF THE INVENTION

Figure 1:
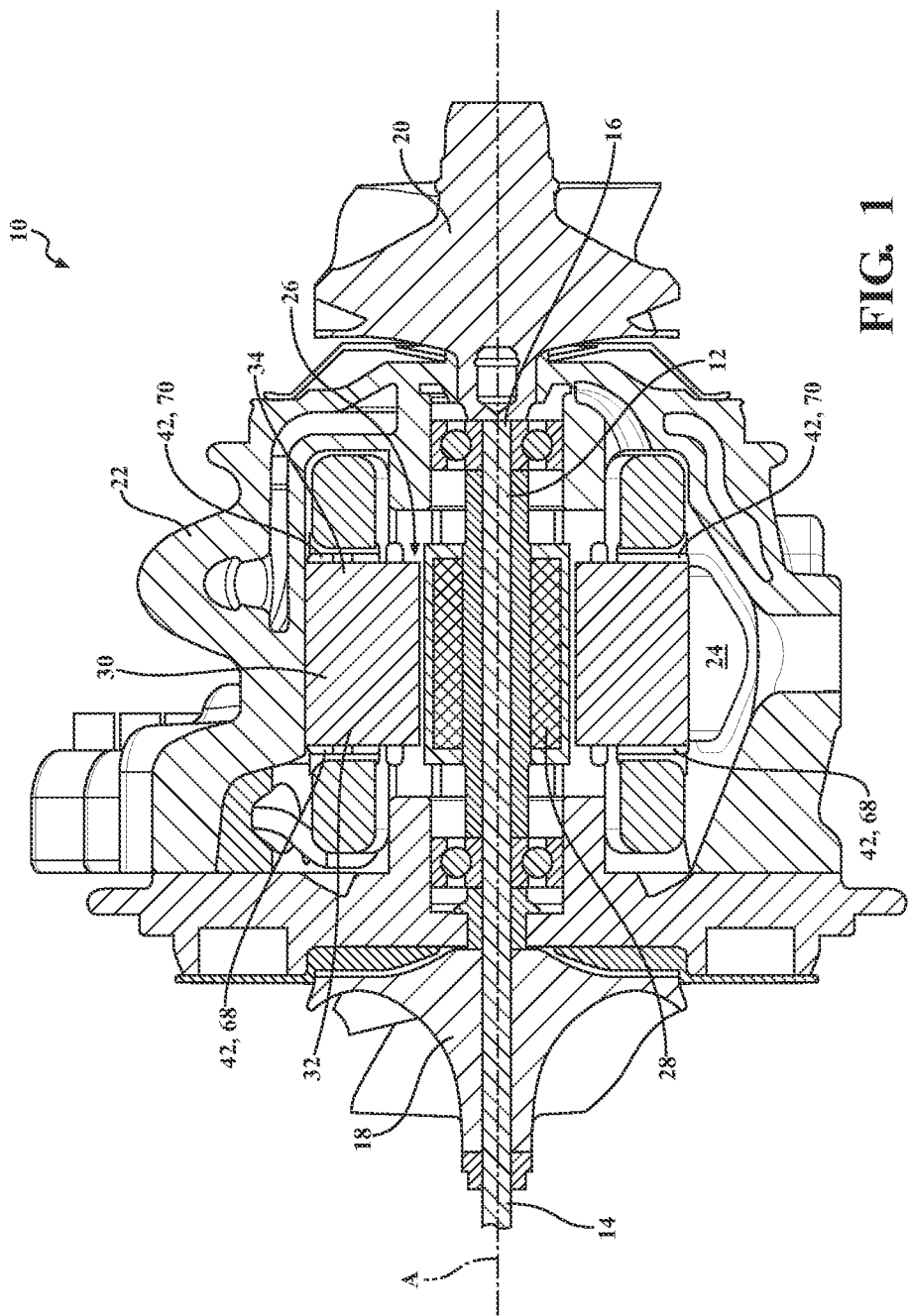
FIG. 1 is a cross-sectional view of an electrically-assisted turbocharger including a shaft extending along an axis A, a compressor wheel coupled to the shaft, a turbine coupled to the shaft, and an electric machine disposed about the shaft, with the electric machine including a rotor and a stator lamination stack.

With reference to the Figures, wherein like numerals indicate like parts throughout the several views, an electrically-assisted turbocharger 10 is shown schematically in FIG. 1. The electrically-assisted turbocharger 10 delivers compressed air to an internal combustion engine. The electrically-assisted turbocharger 10 includes a shaft 12 extending along an axis A between a first shaft end 14 and a second shaft end 16 spaced from the first shaft end 14 along the axis A, a compressor wheel 18 coupled to the first shaft end 14 of the shaft 12, and a turbine wheel coupled to the second shaft end 16 of the shaft 12. Exhaust gas from the internal combustion engine rotates the turbine wheel 20, thus rotating the shaft 12 and rotating the compressor wheel 18. The compressor wheel 18 rotates to deliver compressed air to the internal combustion engine.

The electrically-assisted turbocharger 10 also includes a housing 22 disposed about the shaft 12 and defining a housing interior 24. The electrically-assisted turbocharger 10 further includes an electric machine 26 disposed about the shaft 12 in the housing interior 24 of the housing 22. The electric machine 26 may impart rotational energy to the shaft 12 to increase the amount of compressed air generated by the compressor wheel 18 and delivered the internal combustion engine. In other words, the electric machine 26 may be an electric motor. The electric machine 26 may also impart a negative rotational energy to the shaft 12 to decrease the rotational energy transmitted from the turbine wheel 20 to the shaft 12, thus decreasing the amount of compressed air delivered to the internal combustion engine. Said differently, the electric machine 26 may be an electric generator.

The electric machine 26 includes a rotor 28 extending along the axis A and rotatably coupled to the shaft 12. The electric machine 26 also includes a stator lamination stack radially spaced from the rotor 28 such that the rotor 28 is radially disposed between the shaft 12 and the stator lamination stack 30. The stator lamination stack 30 has a first stator end 32 and a second stator end 34 spaced from the first stator end 32. The first stator end 32 is proximate to the compressor wheel 18, and the second stator end 34 is proximate to the turbine wheel 20. The stator lamination stack 30 also has a plurality of circumferentially spaced teeth 36 extending between the first and second stator ends 32, 34, with the plurality of circumferentially spaced teeth 36 extending radially with respect to the axis A and with the plurality of circumferentially spaced teeth 36 defining gaps 38 therebetween.

The electric machine 26 further includes a coil winding 40 disposed in the gaps 38 between the circumferentially spaced teeth 36 of the stator lamination stack 30. The coil winding 40 may be arranged in loops about the stator lamination stack 30 and coupled to the first and second stator ends 32, 34 of the stator lamination stack 30. The coil winding 40 may form at least three phases equally disposed about the axis A. The coil winding 40 may be comprise copper, or a similarly conductive metal, and may be able to transmit electric current through the coil winding 40 to rotate the rotor 28. The coil winding 40 may also include insulating material surrounding the copper.

Figure 2A:
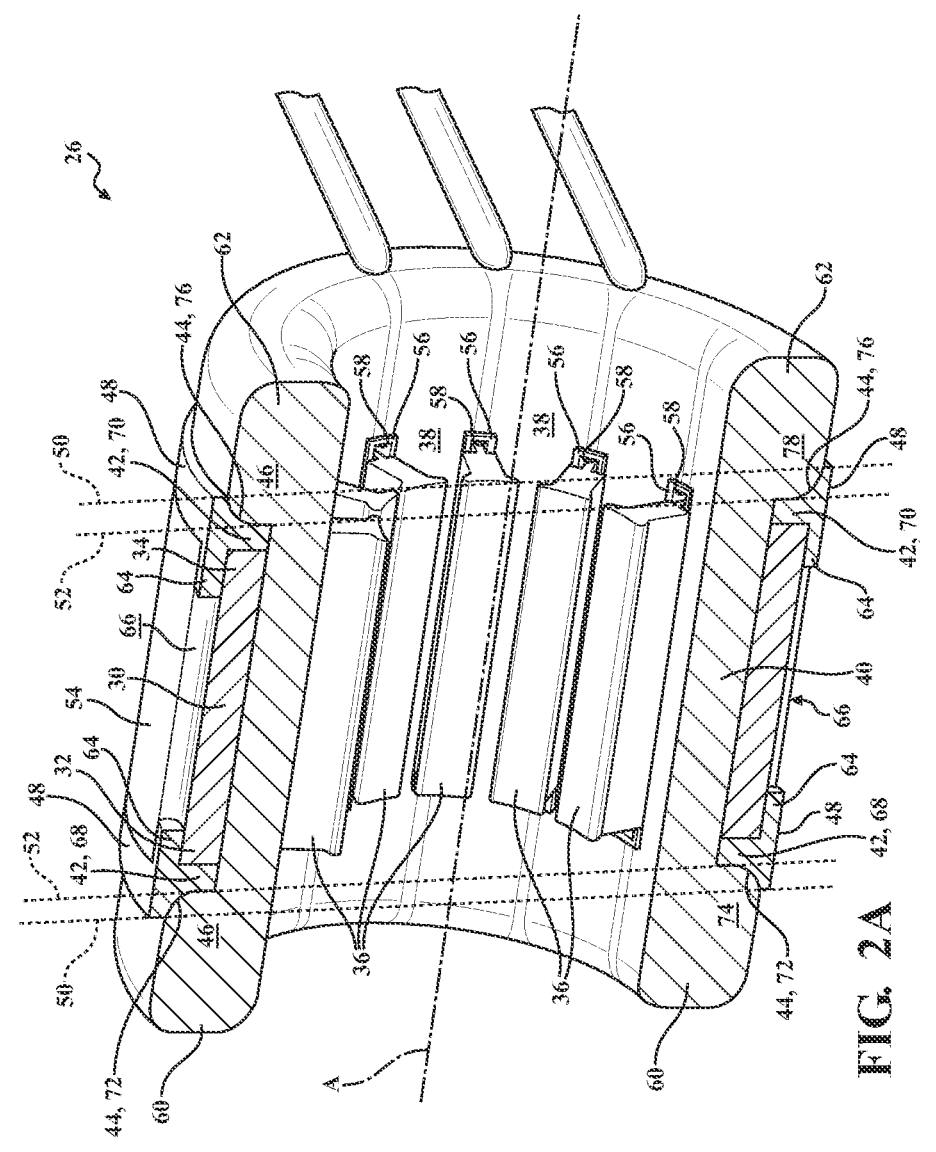
Figure 2B:
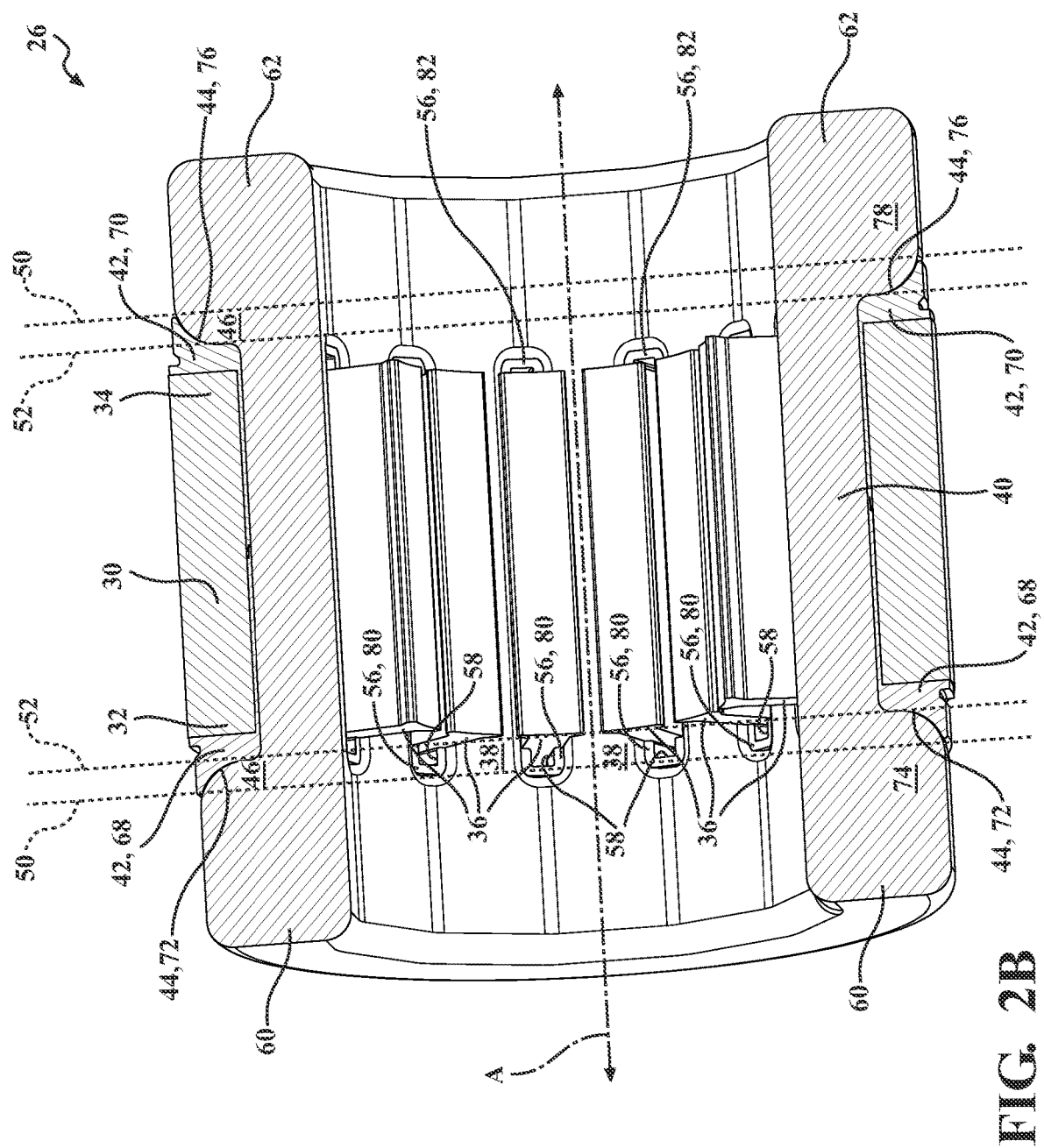
FIG. 2B is a cross-sectional view of the electric machine of FIG. 1 taken along the axis A, with the electric machine including a first guard plate and a second guard plate, where first teeth guards of the first guard plate contacting, engaging, and axially overlapping second teeth guards of the second guard plate.
Figure 3A:
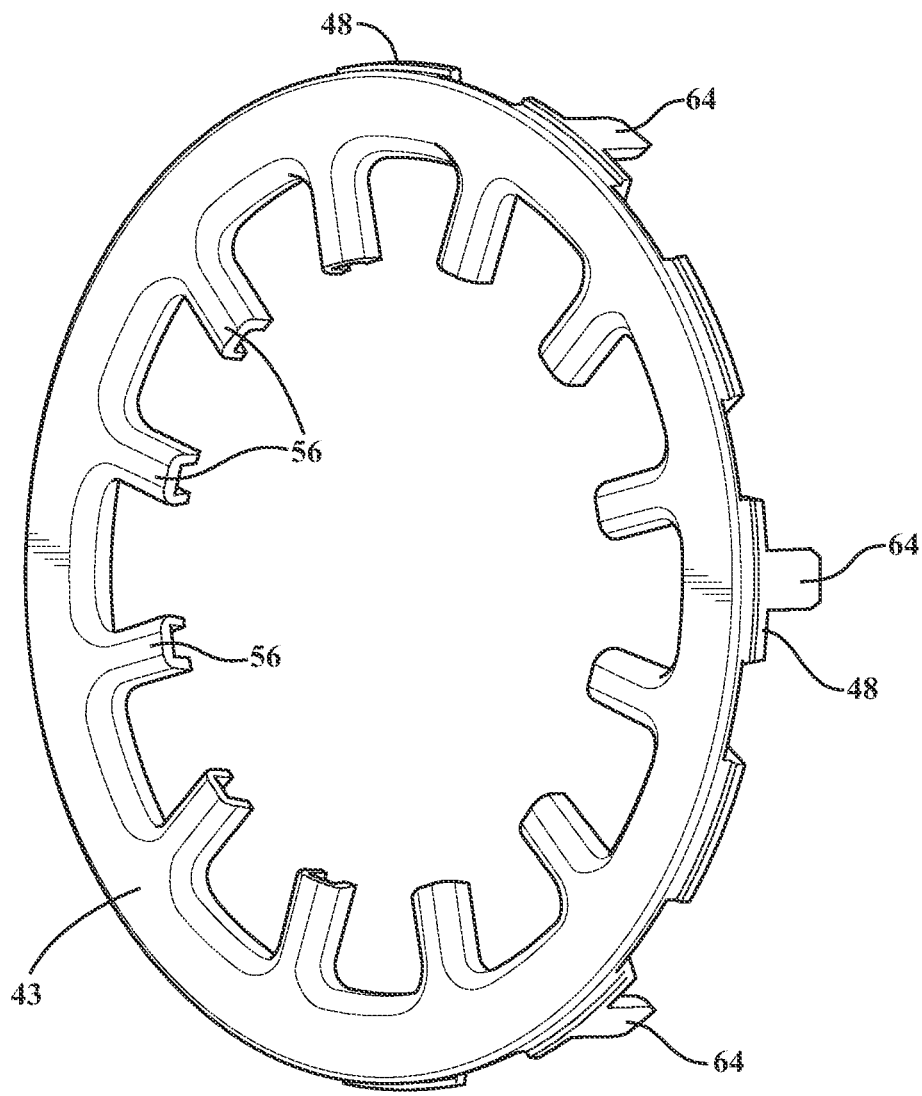
FIG. 3A is a perspective view of the guard plate of FIG. 2A, with the guard plate including a plurality of teeth guards and presenting a flat surface.
Figure 3B:
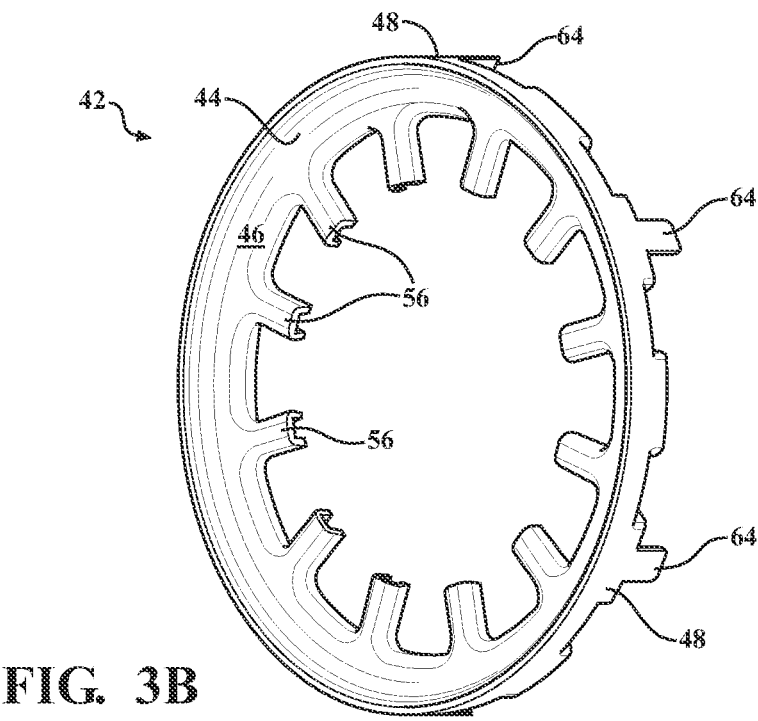
FIG. 3B is a perspective view of the guard plate of FIG. 2A, with the guard plate including the plurality of teeth guards and presenting a curved surface.
Figure 3C:
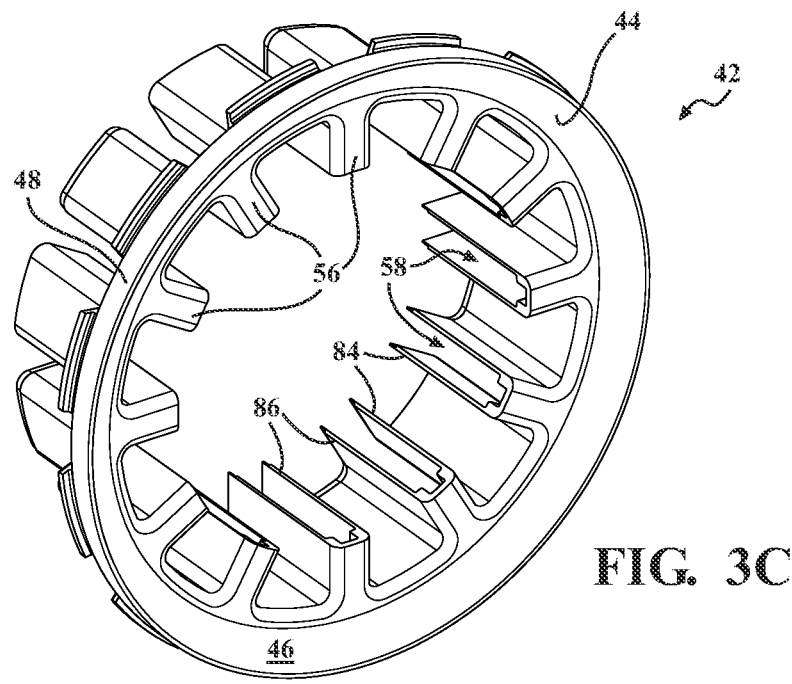
FIG. 3C is a perspective view of the guard plate of FIG. 2B, with the first teeth guards circumferentially alternating between a male configuration and a female configuration.

The electric machine 26 further includes a guard plate 42 disposed at one of the first and second stator ends 32, 34 of the stator lamination stack 30. The guard plate 42 extends radially away from the axis A and includes a plurality of teeth guards 56 extending radially with respect to said axis A, as shown in FIGS. 3A 3B, and 3C. Each of the plurality of teeth guards 56 is aligned with one of the plurality of teeth 36 of the stator lamination stack 30 to electrically insulate the coil winding 40 from the plurality of teeth 36 of the stator lamination stack 30, as shown in FIGS. 2A and 2B.

The guard plate 42 prevents the coil winding 40 from contacting the teeth 36 of the stator lamination stack 30 at either the first stator end 32 or the second stator end 34, thus providing electrical isolation between the coil winding 40 and the teeth 36 of the stator lamination stack 30. Instead, the coil winding 40 contacts the teeth guards 56 of the guard plate 42, thus allowing the coil winding 40 to curve without any sharp bends or irregularities. As such, the teeth guards 56 of the guard plate 42 prevent the coil winding from undergoing stress and degrading at any particular section of the coil winding 40 undergoing sharp bends or irregularities. Irregularities may include, but are not limited to, abrasions, kinks, nicks, dents, and cuts. More specifically, the teeth guards 56 prevent the insulating material surrounding the conductive metal from degrading and exposing the conductive metal. Therefore, the teeth guards 56 of the guard plate 42 prevents degradation of the coil winding 40 and also prevents contact between a degraded section of the coil winding 40 (e.g. a section of the coil winding 40 with the conductive metal exposed) and an electrically conductive component of the electric machine 26 (e.g., the teeth 36 of the stator lamination stack 30). Thus, the guard plate 42 prevents the electric machine 26 from shorting and ensures the proper operation of the electric machine 26. Maintaining the integrity of the insulating material of the coil winding 40 is also important to ensure the safety of the electric machine 26 during operation.

Figure 4A:
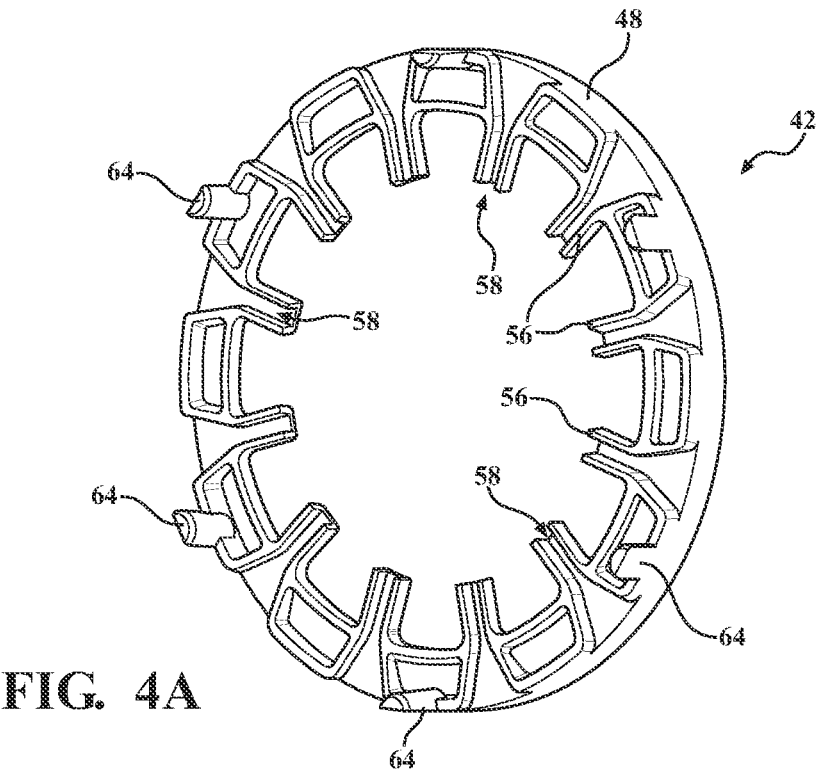
FIG. 4A is a perspective view of the guard plate of FIG. 2A, with the teeth guards of the guard plate being U-shaped and defining a lubrication channel.
Figure 4B:
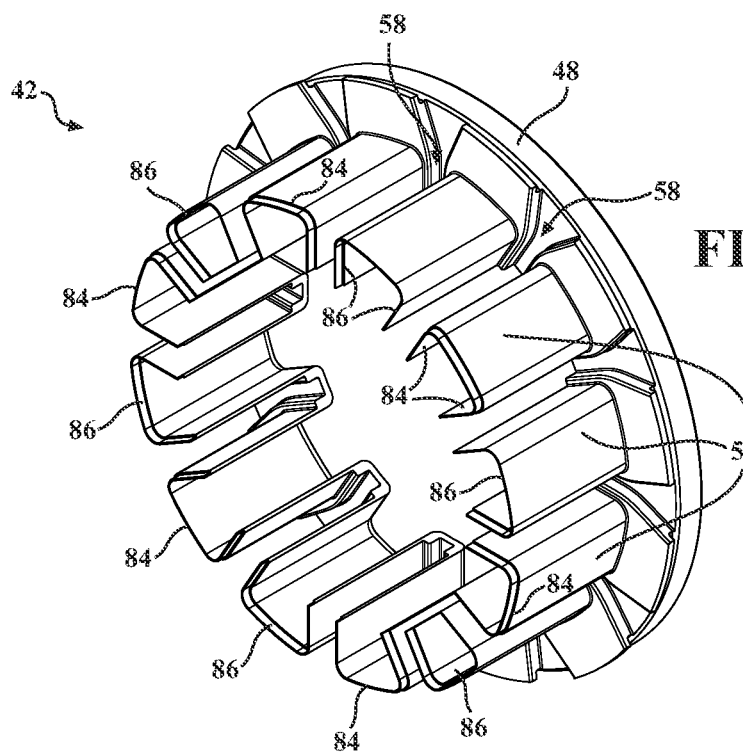
FIG. 4B is a perspective view of the guard plate of FIG. 2B, with the first teeth guards circumferentially alternating between the male configuration and the female configuration.

It is to be appreciated that the teeth guards 56 may extend only partially along a length of each tooth 36 of the stator lamination stack 30 or may extend completely along the length of each tooth 36 of the stator lamination stack 30. The teeth guards 56 may also extend only partially along a width of each tooth 36 of the stator lamination stack 30 or may extend completely along the width of each tooth 36 of the stator lamination stack 30. Each of the plurality of teeth guards 56 may be U-shaped. Moreover, each of the plurality of teeth guards 56 may define a lubrication channel 58, as shown in FIGS. 2A, 2B, 4A, and 4B. It is to be appreciated that FIG. 4A is the back side of the guard plate 42 as depicted in FIGS. 3A and 3B, and FIG. 4B is the back side of the guard plate 42 as depicted in FIG. 3C. In the embodiments where the teeth guards 56 are U-shaped, the teeth guards 56 may partially envelop the teeth 36 of the stator lamination stack. It is to be appreciated that the teeth guards 56 may also have smooth and curved edges defining the U-shape. These smooth and curved edges further prevent the coil winding 40 from undergoing sharp bends or irregularities, thus further preventing the coil winding 40 from degrading. The lubrication channel 58 may be in fluid communication with a source of lubrication, such as a lubrication inlet defined by the housing 22, to allow lubrication to flow through the lubrication channel 58 defined by the teeth guards 56. Each of the plurality of circumferentially spaced teeth 36 of the stator lamination stack 30 may be aligned with one of the lubrication channels 58 of the plurality of teeth guards 56. The lubrication channels 58 may provide lubrication to each of the circumferentially spaced teeth 36 of the stator lamination stack 30 to cool the circumferentially spaced teeth 36 of the stator lamination stack 30.

The coil winding 40 may have a first winding end 60 proximate to the first stator end 32 of the stator lamination stack 30 and a second winding end 62 proximate to the second stator end 34 of the stator lamination stack 30. The lubrication channels 58 defined by each of the plurality of teeth guards 56 may be in fluid communication with one of the first and second winding ends 60, 62 of the coil winding 40. The lubrication channels 58 may provide lubrication to the first winding end 60 or to the second winding end 62 to cool the coil winding 40. Cooling the coil winding 40 is beneficial because the electric current transmitted through the coil winding 40 can generate heat throughout the coil winding 40.

As shown in FIG. 3A, the guard plate 42 may present a flat surface 43 facing away from the first and second stator ends 32, 34 and extending along a plane, with the coil winding 40 contacting the flat surface 43 of the guard plate 42. The flat surface 43 assists in limiting the axial packaging space of the electric machine 26 in the turbocharger 10. Although shown in FIG. 3A as perpendicular to the axis A, the flat surface 43 need not be perpendicular to the axis A. In a non-limiting example, the flat surface 43 may tilted away from perpendicular relative to the axis A between 0 and 90 degrees, 10 and 80 degrees, 20 to 70 degrees, 30 and 60 degrees, and 40 to 50 degrees. Alternatively, as shown in FIGS. 3B and 3C, the guard plate 42 may present a curved surface 44 facing away from the first and second stator ends 32, 34. The curved surface 44 defines a concave recess 46. The coil winding 40 is disposed at least partially in the concave recess 46 defined by the curved surface 44 to further electrically insulate the coil winding 40 from the one of the first and second stator ends 32, 34 of the stator lamination stack 30. In other words, the coil winding 40 is electrically insulated from the stator end 32, 34 at which the guard plate 42 is disposed.

In the embodiment with the curved surface 44, the coil winding 40 contacts the curved surface 44 of the guard plate 42, thus allowing the coil winding 40 to curve without any sharp bends or irregularities. As such, the curved surface 44 of the guard plate 42 further prevents the coil winding 40 from degrading at any particular section of the coil winding 40 undergoing sharp bends or irregularities. Therefore, the curved surface 44 of the guard plate 42 further prevents degradation of the coil winding 40 and also further prevents contact between a degraded section of the coil winding 40 and an electrically conductive component of the electric machine 26 (e.g., the teeth 36 of the stator lamination stack 30, the stator lamination stack 30, the housing 22). Thus, the curved surface 44 of the guard plate 42 prevents the electric machine 36 from shorting and ensures the proper operation of the electric machine 26. It is to be appreciated that the curved surface 44 may be approximated through a series of adjacent flat sections and need not be a continuous curve. In this instance, the concave recess 46 is to be understood as defined by the series of adjacent flat sections.

As shown in FIG. 2A, the guard plate 42 may have an outermost plate surface 48 facing away from the axis A that extends axially away from the first and second stator ends 32, 34 to a first axial point 50. The outermost plate surface 48 may be furthest away from the axis A. The curved surface 44 extends from the first axial point 50 toward the first and second stator ends 32, 34 to a second axial point 52 disposed axially between the first axial point 50 and the stator end 32, 34 at which the guard plate 42 is disposed. Said differently, the curved surface 44 extends between first and second axial points 50, 52 spaced apart from one another along the axis A. The curved surface 44, therefore, may also partially face the axis A.

The curved surface 44 may extend axially from the first axial point 50 and may curve to extend radially to the second axial point 52. Said differently, the curved surface 44 may have a cross-section that approximates a ninety-degree angle. In this embodiment, the curved surface 44 may define the concave recess 46 such that the coil winding 40 is disposed between the guard plate 42 and the axis A when the coil winding 40 is at least partially disposed in the concave recess 46.

The stator lamination stack 30 may have an outermost stator surface 54 facing away from the axis A, and the guard plate 42 may have the outermost plate surface 48 facing away from the axis A. The outermost stator surface 54 may be the surface of the stator lamination stack 30 radially furthest from the axis A, and the outermost plate surface 48 may be the surface of the guard plate 42 radially furthest from the axis A. In some embodiments, the outermost stator surface 54 and the outermost plate surface 48 are radially aligned with one another. Said differently, there may be little to no difference between the relative radial distances from the axis A of the outermost stator surface 54 and the outermost plate surface 48. The outermost stator surface 54 and the outermost plate surface 48 may be flush with one another, particularly at the point(s) of contact between the outermost stator surface 54 and the outermost plate surface 48.

Although not required, in some embodiments the guard plate 42 includes at least one seating peg 64 extending away from the curved surface 44 axially toward the stator end 32, 34 opposite the stator end 32, 34 at which the guard plate 42 is disposed. It is to be appreciated that the guard plate 42 may include one, two, three, four, five, six, seven, eight, or more than eight seating pegs 64. The seating peg 64 positions the guard plate 42 relative to the stator lamination stack 30. More specifically, the seating peg 64 engages with the stator lamination stack 30 such that the relative positions of the guard plate 42 and the stator lamination stack 30 do not change. It is to be appreciated that the seating peg 64 may also prevent rotation between the guard plate 42 and the stator lamination stack 30.

The stator lamination stack 30 may define at least one seating groove 66, and the at least one seating peg 64 may be disposed at least partially in the at least one seating groove 66 to position the guard plate 42 relative to the stator lamination stack 30. It is to be appreciated that the stator lamination stack 30 may define one, two, three, four, five, six, seven, eight, or more than eight seating grooves 66. It is also to be appreciated that the number of seating grooves 66 defined by the stator lamination stack 30 may correspond to the number of seating pegs 64 of the guard plate 42 (i.e., be the same number). The seating grooves 66 assist in positioning the guard plate 42 relative to the stator lamination stack 30 by preventing rotation between the guard plate 42 and the stator lamination stack 30 because each seating peg 64 is disposed at least partially in one of the seating grooves 66.

In one embodiment, the outermost stator surface 54 of the stator lamination stack 30 at least partially defines the at least one seating groove 66. It is to be appreciated that the outermost stator surface 54 may completely define the at least one seating groove 66. However, it is also to be appreciated that the at least one seating groove 66 may be defined between the outermost stator surface 54 of the stator lamination stack 30 and the shaft 12. The at least one seating peg 64 may be inserted into the at least one seating groove 66 by moving either the stator lamination stack 30 axially toward the guard plate 42, or by moving the guard plate 42 axially toward the stator lamination stack 30.

The plurality of circumferentially spaced teeth 36 of the stator lamination stack 30 may extend radially inward toward the axis A, and the plurality of teeth guards 56 may extend radially inward toward the axis A. It is to be appreciated, however, that the plurality of circumferentially spaced teeth 36 of the stator lamination stack 30 may extend radially outward away from the axis A, and the plurality of teeth guards 56 may extend radially outward away from the axis A. The outermost stator surface 54 of the stator lamination stack 30, therefore, may be substantially cylindrical but for the seating grooves 66 if the seating grooves 66 are defined at least partially by the outermost stator surface 54. It is to be appreciated that the outermost stator surface 54 may be completely cylindrical in the embodiments where the seating grooves 66 are defined between the outermost stator surface 54 of the stator lamination stack 30 and the shaft 12, and in the embodiments where the stator lamination stack 30 does not define any seating grooves 66.

Although not required, the guard plate 42 may comprise a thermoplastic resin. It is to be appreciated, however, that the guard plate 42 may comprise a thermoset resin, a composite material, and/or a ceramic material. The material that the guard plate comprises may be chosen to increase the dielectric strength of the guard plate 42 to further electrically insulate the coil winding 40 from the stator lamination stack 30, thus preventing the coil winding from shorting. However, it is also to be appreciated that the guard plate 42 may even be comprised of a metal or other electrically conductive material.

The first winding end 60 may have a first outermost winding surface facing away from the axis A, and a first innermost winding surface facing toward the axis A. A first radius may be defined as equal to half the distance between the first innermost winding surface and the first outermost winding surface. Similarly, the second winding end 62 may have a second outermost winding surface facing away from the axis A, and a second innermost winding surface facing toward the axis A. A second radius may be defined as equal to half the distance between the second innermost winding surface and the second outermost winding surface. in the embodiments where the guard plate 42 is disposed at the first stator end 32, the curved surface 44 of the guard plate 42 in cross-section may be delimited to extend along an arc defined by the first radius. Said differently, the curved surface 44 may extend along the arc as defined by the first radius to form a portion of a circle in cross-section. In the embodiments where the guard plate 42 is disposed at the second stator end 34, the curved surface 44 of the guard plate 42 in cross-section may be delimited to extend along an arc defined by the second radius. Said differently, the curved surface 44 may extend along the arc as defined by the second radius to form a portion of a circle in cross-section.

The cross-sections may be taken along the axis A bisecting the guard plate 42, presenting two mirror images of the guard plate 42 in cross-section. The curvature of the curved surface 44 may be the same for either mirror image of the guard plate 42 in cross-section. It is to be appreciated, however, that the curvature of the curved surface 44 of the guard plate 42 may change as the curved surface 44 extends about the axis A, thus presenting two images in cross-section that are not mirror images of one another.

The guard plate 42 may be disposed at the first stator end 32 of the stator lamination stack 30 proximate to the compressor wheel 18. In other words, the guard plate 42 may be on the compressor-side of the electrically-assisted turbocharger 10. Alternatively, the guard plate 42 may be disposed at the second stator end 34 of the stator lamination stack 30 proximate to the turbine wheel 20. In other words, the guard plate 42 may be on the turbine-side of the electrically-assisted turbocharger 10.

Although not required, the guard plate 42 may be further defined as a first guard plate 68, and the electric machine may include a second guard plate 70. The first guard plate 68 may be disposed at the first stator end 32 of the stator lamination stack 30 proximate to the compressor wheel 18, and the second guard plate 70 may be disposed at the second stator end 34 of the stator lamination stack 30 proximate to the turbine wheel 20. The first and second guard plates 68, 70 may be mirror images of one another. The second guard plate 70 may include all features of the guard plate 42 as described above.

More specifically, the guard plate 42 may be further defined as the first guard plate 68 and the plurality of teeth guards 56 may be further defined as first plurality of teeth guards 80. Moreover, the first guard plate 68 may present a first curved surface 72 defining a first concave recess 74, or may have a first flat surface facing away from the first and second stator ends 32, 34 and extending along a first plane. The coil winding 40 may contact the first flat surface of the first guard plate 68. The second guard plate 70 may be disposed at the other of the first and second stator ends 32, 34 of the stator lamination stack 30. Said differently, in the embodiments where the first guard plate 68 is disposed at the first stator end 32, the second guard plate 70 is disposed at the second stator end 34. In the embodiments where the first guard plate 68 is disposed at the second stator end 34, the second guard plate 70 is disposed at the first stator end 32.

The second guard plate 70 may extend radially away from the axis A and include a second plurality of teeth guards 82 extending radially with respect to the axis A. Each of the second plurality of teeth guards 82 may be aligned with one of the plurality of circumferentially spaced teeth 36 of the stator lamination stack 30 to electrically insulate the coil winding 40 from the stator lamination stack 30. The second guard plate 70 may present a second curved surface 76 facing away from the first and second stator ends 32, 34, or may have a second flat surface facing away from the first and second stator ends 32, 34 and extending along a second plane. The coil winding 40 may contact the second flat surface of the second guard plate 70. The second curved surface 76 may define a second concave recess 78, and the coil winding 40 may be disposed at least partially in the second concave recess 78 defined by the second curved surface 76 to electrically insulate the coil winding 40 from the other of the first and second stator ends 32, 34 of the stator lamination stack 30.

Figure 5A:
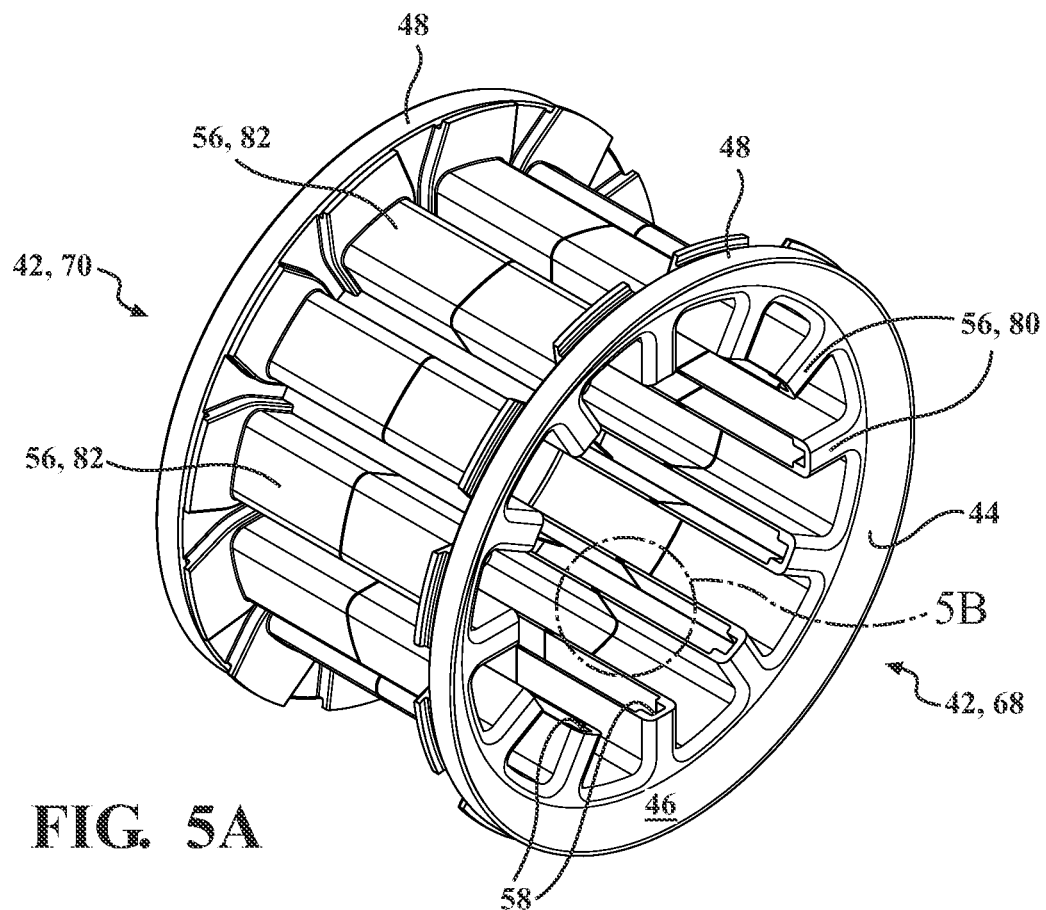
FIG. 5A is a perspective view of the guard plate of FIG. 2B, with the first and second teeth guards of the first and second guard plates engaged with one another.
Figure 5B:
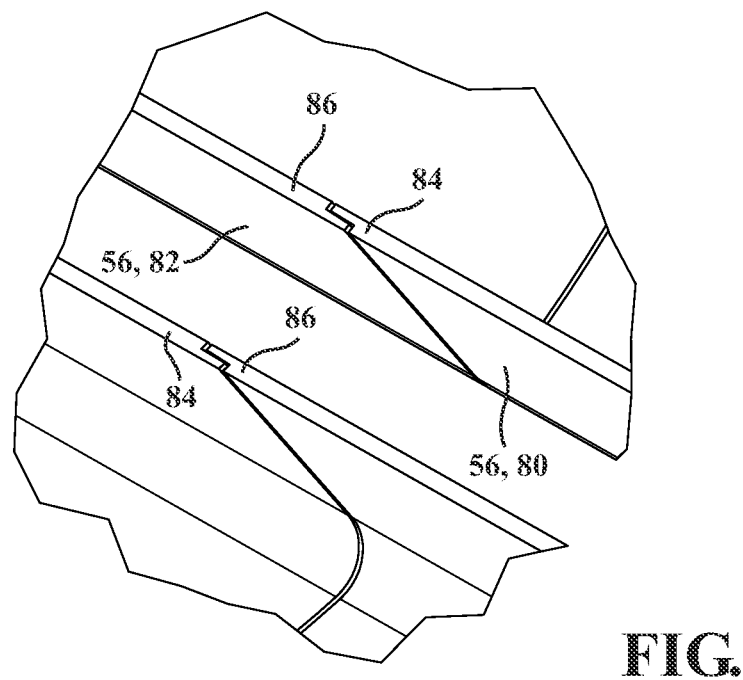
FIG. 5B is an exploded view of the guard plates of FIG. 5A, with the first guard teeth of the first guard plate axially overlapping the second guard teeth of the second guard plate.
Figure 6:
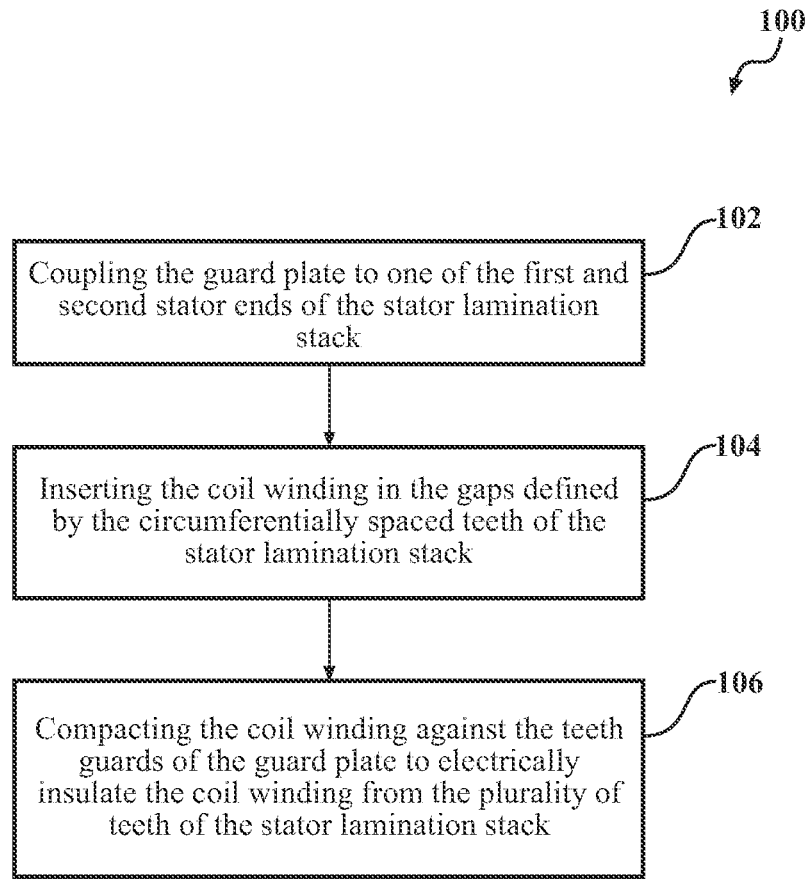
FIG. 6 is a flowchart depicting a method of manufacturing the electrically-assisted turbocharger.

Although not required, as seen in FIGS. 2B, 5A, and 5B, at least a portion of the first teeth guards 80 of the first guard plate 68 and at least a portion of the second teeth guards 82 of the second guard plate 70 are in contact with one another. In other words, the first and second teeth guards 80, 82 may be contacting one another. The first teeth guards 80 may extend along the axis A toward the second guard plate 70, and the second teeth guards 82 may extend along the axis A toward the first guard plate 68.

The first teeth guards 80 and the second teeth guards 82 may contact one another in approximately the axial center between the first guard plate 68 and the second guard plate 70. In other words, the axial lengths of the first teeth guards 80 may approximately equal, or exactly equal, the axial lengths of the second teeth guards 82, allowing the first and second guard plates 68, 70 to be identical to improve manufacturability of the electric machine 26 and/or the electrically-assisted turbocharger 10. However, it is to be appreciated that the first teeth guards 80 and the second teeth guards 82 may contact one another at any location between the first and second guard plates 68, 70.

In the embodiments where the first teeth guards 80 of the first guard plate 68 and the second teeth guards 82 of the second guard plate 70 contact one another, the first teeth guards 80 and the second teeth guards 82 act as insulator sleeves and remove the need for slot liner paper for the stator lamination stack 30 which traditionally acts as an electrical insulator between the coil winding 40 and the stator lamination stack 30. Eliminating the need for slot liner paper also reduces the number of components and the manufacturing time of the electric machine 26 and/or the electrically-assisted turbocharger 10.

More specifically, contact between the first teeth guards 80 and the second teeth guards 82 prevents the coil winding 40 from contacting the stator lamination stack 30 between the first stator end 32 and the second stator end 34, thus providing electrical insulation between the coil winding 40 and the stator lamination stack 30. Therefore, the first and second teeth guards 80, 82 of the guard plate 42 prevents contact between the degraded section of the coil winding 40 (e.g. a section of the coil winding 40 with the conductive metal exposed) and an electrically conductive component of the electric machine 26 (e.g., the stator lamination stack 30). Thus, the first and second guard plates 68, 70 being in contact with one another further prevents the electric machine 26 from shorting and ensures the proper operation of the electric machine 26 without including slot liner paper.

In some embodiments, at least a portion of the first teeth guards 80 and at least a portion of the second teeth guards 82 are engageable together to electrically insulate the coil winding 40 from the stator lamination stack 30. It is to be appreciated that, although the first and second teeth guards 80, 82 may physically lock together, the first and second teeth guards 80, 82 need not physically lock together to be engageable with one another. Instead, even a loose-fitting connection that allows the first and second guard plates 68, 70 to engage together assists in orienting the first guard plate 68 relative to the second guard plate 70, thus also orienting the first and second teeth guards 80,82 relative to the teeth 36 of the stator lamination stack 30. After the coil winding 40 has been compacted against the first and second guard plates 68, 70, the first and second guard plates 68, 70 will generally be immovable relative to one another. Thus, having the first and second guard plates 68, 70 lock together is not necessary to permanently orient the first and second guard plates 68, 70 relative to one another in the electric machine 26 after manufacturing the electric machine 26 and/or the electrically-assisted turbocharger 10.

As shown in FIGS. 2B, 5A, and 5B, at least a portion of the first teeth guards 80 and at least a portion of the second teeth guards 82 may axially overlap one another. A portion of the first teeth guards 80 may be spaced from a portion of the second teeth guards 82. The portion of the first teeth guards 80 may be spaced from the portion of the second teeth guards 82 such that the portion of the first teeth guards 80 is spaced between the second teeth guards 82 and the teeth 36 of the stator lamination stack 30. Alternatively or additionally, the portion of the second teeth guards 82 may be spaced from the portion of the first teeth guards 80 such that the portion of the second teeth guards 82 is spaced between the first teeth guards 80 and the teeth 36 of the stator lamination stack 30. The axial overlap between the first and second teeth guards 80, 82 further assists in providing electrical insulation between the coil winding 40 and the stator lamination stack 30 by preventing gaps that may be defined between the first and second teeth guards 80, 82 of the first and second guard plates 68, 70.

Moreover, the first teeth guards 80 may be a male configuration 84 and the second teeth guards 82 may be a female configuration 86. Alternatively, the first teeth guards 80 may be the female configuration 86 and the second teeth guards 82 may be the male configuration 84. The male configuration 84 may fit inside the female configuration 86 such that the first teeth guards 80 and the second teeth guards 82 are engageable together to electrically insulate the coil winding 40 from the stator lamination stack 30.

It is also to be appreciated that some of the first teeth guards 80 may be the male configuration 84 and some of the first teeth guards 80 may be the female configuration 86. In the embodiment where the first teeth guards 80 include both the male configuration 84 and the female configuration 86, the corresponding second teeth guards 82 are the opposite female configuration 86 and male configuration 84, respectively. Further, the first teeth guards 80 may circumferentially alternate between the male configuration 84 and the female configuration 86, and the second teeth guards 82 may circumferentially alternate between the female configuration 86 and the male configuration 84. As described above, the male and female configurations 84, 86 of the first and second teeth guards 80, 82 are engageable with one another. Alternating male and female configurations 84, 86 of both the first and second teeth guards 80, 82 further assist in orienting the first guard plate 68 relative to the second guard plate 70 to ensure the first and second teeth guards 80, 82 are aligned with the teeth 36 of the stator lamination stack 30.

A method 100 of manufacturing the electrically-assisted turbocharger 10 includes the step 102 of coupling the guard plate 42 to one of the first and second stator ends 32, 34 of the stator lamination stack 30. The method 102 also includes the step 104 of inserting the coil winding 40 in the gaps 38 defined by the circumferentially spaced teeth 36 of the stator lamination stack 30. The method 100 further includes the step 106 of compacting the coil winding 40 against the teeth guards 56 of the guard plate 42 to electrically insulate the coil winding 40 from the plurality of teeth 36 of the stator lamination stack 30.

The teeth guards 56 of the guard plate 42 prevent the coil winding 40 from contacting the stator lamination stack 30 during the step 106 of compacting the coil winding 40 against the teeth guards 56 of the guard plate 42. Compaction of the coil winding 40 is of particular importance because sharp bends or irregularities may appear in the coil winding 40 immediately after compaction. However, the teeth guards 56 of the guard plate 42 allows the coil winding 40 to curve without any sharp bends or irregularities during the step 106 of compaction. As such, the step 106 of compacting the coil winding 40 against the teeth guards 56 of the guard plate 42 prevents the coil winding 40 from degrading at any particular section of the coil winding 40 by preventing any sharp bends or irregularities in the coil winding 40. Degradation of the coil winding is detrimental to the function of the electric machine 26 because contact between a degraded section of the coil winding 40 and an electrically conductive component of the electric machine 26 (e.g., the stator lamination stack 30) is able to short the electric machine 26 and prevent the electric machine 26 from operating properly. Thus, the step 106 of compacting the coil winding against the teeth guards 56 of the guard plate 42 ensures the proper operation of the electric machine 26 by preventing degradation of the coil winding 40.

The step 102 of coupling the guard plate 42 to one of the first and second stator ends 32, 34 of the stator lamination stack 30 may include disposing the at least one seating peg 64 at least partially in the at least one seating groove 66 to position the guard plate 42 relative to the stator lamination stack 30. The step 102 of coupling the guard plate 42 to one of the first and second stator ends 32, 34 by disposing the at least one seating peg 64 at least partially in the at least one seating groove 66 may precede the step 104 of inserting the coil winding 40 in the gaps 38 defined by the circumferentially spaced teeth 36 of the stator lamination stack 30.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. An electric machine comprising;
  a rotor extending along an axis;
  a stator lamination stack radially spaced from said rotor, with said stator lamination stack having,
    a first stator end;
    a second stator end spaced from said first stator end; and
    a plurality of circumferentially spaced teeth extending between said first and second stator ends radially with respect to said axis, said plurality of circumferentially spaced teeth defining gaps therebetween;
  a coil winding disposed in said gaps between said circumferentially spaced teeth of said stator lamination stack; and
  a guard plate disposed at one of said first and second stator ends of said stator lamination stack, said guard plate extending radially away from said axis and comprising a plurality of teeth guards extending radially with respect to said axis,
  wherein each of said plurality of teeth guards is aligned with one of said plurality of teeth of said stator lamination stack to electrically insulate said coil winding from said plurality of teeth of said stator lamination stack; and
  wherein said plurality of teeth of said stator lamination stack extend radially inward toward said axis and said teeth guards of said guard plate extend radially inward toward said axis.

2. The electric machine as set forth in claim 1, wherein each of said plurality of teeth guards is U-shaped.

3. The electric machine as set forth in claim 2, wherein each of said plurality of teeth guards defines a lubrication channel, and wherein each of said plurality of teeth of said stator lamination stack is aligned with one of said lubrication channels of said plurality of teeth guards.

4. The electric machine as set forth in claim 1, wherein said guard plate presents a flat surface facing away from said first and second stator ends and extending along a plane, with said coil winding contacting said flat surface of said guard plate.

5. The electric machine as set forth in claim 1, wherein said guard plate presents a curved surface facing away from said first and second stator ends and defining a concave recess, and wherein said coil winding is disposed at least partially in said concave recess defined by said curved surface to electrically insulate said coil winding from said one of said first and second stator ends of said stator lamination stack.

6. The electric machine as set forth in claim 5, wherein said guard plate has an outermost plate surface facing away from said axis that extends axially away from said first and second stator ends to a first axial point, and wherein said curved surface extends from said first axial point toward said first and second stator ends to a second axial point disposed axially between said first axial point and said stator end at which said guard plate is disposed.

7. The electric machine as set forth in claim 6, wherein said curved surface extends axially from said first axial point and curves to extend radially to said second axial point.

8. The electric machine as set forth in claim 1, wherein said stator lamination stack has an outermost stator surface facing away from said axis, wherein said guard plate has an outermost plate surface facing away from said axis, and wherein said outermost stator surface and said outermost plate surface are radially aligned with one another.

9. The electric machine as set forth in claim 5, wherein said guard plate comprises at least one seating peg extending away from said curved surface axially toward said stator end opposite said stator end at which said guard plate is disposed.

10. The electric machine as set forth in claim 9, wherein said stator lamination stack defines at least one seating groove, and wherein said at least one seating peg is disposed at least partially in said at least one seating groove to position said guard plate relative to said stator lamination stack.

11. The electric machine as set forth in claim 10, wherein said stator lamination stack has an outermost stator surface facing away from said axis, and wherein said outermost stator surface of said stator lamination stack at least partially defines said at least one seating groove.

12. The electric machine as set forth in claim 1, wherein said guard plate is further defined as a first guard plate and said plurality of teeth guards are further defined as a first plurality of teeth guards, and wherein said electric machine comprises a second guard plate disposed at the other of said first and second stator ends of said stator lamination stack, with said second guard plate extending radially away from said axis and comprising a second plurality of teeth guards extending radially with respect to said axis, wherein each of said second plurality of teeth guards is aligned with one of said plurality of teeth of said stator lamination stack to electrically insulate said coil winding from said stator lamination stack.

13. The electric machine as set forth in claim 12, wherein at least a portion of said first teeth guards of said first guard plate and at least a portion of said second teeth guards of said second guard plate are in contact with one another.

14. The electric machine as set forth in claim 13, wherein at least a portion of said first teeth guards and at least a portion of said second teeth guards are engageable together to electrically insulate said coil winding from said stator lamination stack.

15. The electric machine as set forth in claim 14, wherein at least a portion of said first teeth guards and at least a portion of said second teeth guards axially overlap one another.

16. The electric machine as set forth in claim 15, wherein said first teeth guards circumferentially alternate between a male configuration and a female configuration, wherein said second teeth guards circumferentially alternate between a female configuration and a male configuration, and wherein said male and female configurations of said first and second teeth guards are engageable with one another.

17. The electric machine as set forth in claim 12, wherein said first guard plate presents a first curved surface defining a first concave recess, wherein said second guard plate presents a second curved surface facing away from said first and second stator ends and defining a second concave recess, and wherein said coil winding is disposed at least partially in said second concave recess defined by said second curved surface to electrically insulate said coil winding from said other of said first and second stator ends of said stator lamination stack.

18. The electric machine as set forth in claim 1 further defined as an electric motor.

19. The electric machine as set forth in claim 1 further defined as an electric generator.

20. A method of manufacturing an electric machine, the electric machine including a rotor extending along an axis, a stator lamination stack radially spaced from the rotor, with the stator lamination stack having a first stator end and a second stator end spaced from the first stator end along the axis, and a plurality of circumferentially spaced teeth extending between the first and second stator ends, with the plurality of circumferentially spaced teeth extending radially with respect to the axis, and with the plurality of circumferentially spaced teeth defining gaps therebetween, a coil winding disposed in the gaps between the circumferentially spaced teeth of the stator lamination stack, and a guard plate disposed at one of the first and second stator ends of the stator lamination stack, the guard plate extending radially away from the axis and comprising a plurality of teeth guards extending radially with respect to the axis, each of the plurality of teeth guards being aligned with one of the plurality of teeth of the stator lamination stack, said method comprising the steps of:
    coupling the guard plate to one of the first and second stator ends of the stator lamination stack;
    inserting the coil winding in the gaps defined by the circumferentially spaced teeth of the stator lamination stack; and
    compacting the coil winding against the teeth guards of the guard plate to electrically insulate the coil winding from the plurality of teeth of the stator lamination stack.

\* \* \* \* \*